(12) United States Patent
Hart et al.

(10) Patent No.: US 11,076,211 B2
(45) Date of Patent: Jul. 27, 2021

(54) MOUNT ASSEMBLY AND SPEAKER MOUNT WITH SCREWLESS DOG

(71) Applicant: Swarm Holdings LLC., Salt Lake City, UT (US)

(72) Inventors: Jonathan Neil Hart, Salt Lake City, UT (US); Margaret Goertzen, Salt Lake City, UT (US); Chris Witham, Midvale, UT (US)

(73) Assignee: SWARM HOLDINGS LLC., Salt Lake City, UT (US)

( * ) Notice: Subject to any disclaimer, the term of this patent is extended or adjusted under 35 U.S.C. 154(b) by 0 days.

(21) Appl. No.: 16/900,834

(22) Filed: Jun. 12, 2020

(65) Prior Publication Data

US 2020/0396525 A1    Dec. 17, 2020

Related U.S. Application Data

(60) Provisional application No. 62/860,478, filed on Jun. 12, 2019, provisional application No. 63/036,355, filed on Jun. 8, 2020.

(51) Int. Cl.
*H04R 1/02* (2006.01)
*F16M 13/02* (2006.01)

(52) U.S. Cl.
CPC .......... *H04R 1/025* (2013.01); *F16M 13/027* (2013.01); *H04R 2201/021* (2013.01)

(58) Field of Classification Search
CPC . H04R 1/025; H04R 2201/021; F16M 13/027
USPC ......................................................... 381/87
See application file for complete search history.

(56) References Cited

U.S. PATENT DOCUMENTS

| | | |
|---|---|---|
| 6,007,028 A | 12/1999 | Lin |
| 7,731,130 B2 | 6/2010 | Decanio et al. |
| 8,256,728 B2 | 9/2012 | Wright |
| 9,028,309 B2 | 5/2015 | Rimmer |
| 9,084,046 B2 | 7/2015 | Ivey et al. |
| 2005/0072891 A1 | 4/2005 | Wright |
| 2013/0039082 A1 | 2/2013 | Flescher et al. |
| 2015/0247516 A1 | 9/2015 | Swan |

(Continued)

FOREIGN PATENT DOCUMENTS

| | | |
|---|---|---|
| EP | 2746643 B1 | 6/2017 |
| GB | 2416371 A | 1/2006 |

(Continued)

*Primary Examiner* — Sean H Nguyen
(74) *Attorney, Agent, or Firm* — Jason P. Webb; Pearson Butler

(57) ABSTRACT

A mount, mount assembly, and speaker mount. That includes: a mount body with flange; a tower assembly including: a trigger, a dog; a bias member biasing the dog towards the mount body; a path guide guiding the dog along the tower assembly. The path guide allows/forces the dog to be oriented according to: a first orientation wherein the foot is pointed directly towards the mount body and substantially aligned with the tower assembly, and a second orientation wherein the foot is not so pointed and aligned such that the foot does interfere with travel of the mount through an aperture when the dog is in a second position that is spaced closer to the mount body than the first position. The dog changes between positions by operation of the bias member and not by a screw.

20 Claims, 14 Drawing Sheets

(56) References Cited

U.S. PATENT DOCUMENTS

| | | |
|---|---|---|
| 2016/0241940 A1 | 8/2016 | Yang |
| 2016/0366501 A1* | 12/2016 | Ivey .................. F16M 13/027 |
| 2018/0054665 A1* | 2/2018 | Ivey ...................... H04R 1/345 |
| 2018/0063611 A1 | 3/2018 | Hart |
| 2020/0077168 A1 | 3/2020 | Hart et al. |

FOREIGN PATENT DOCUMENTS

| | | | | |
|---|---|---|---|---|
| WO | WO0169965 | * | 9/2001 | ............ H04R 1/02 |
| WO | 2005022948 A2 | | 3/2005 | |

* cited by examiner

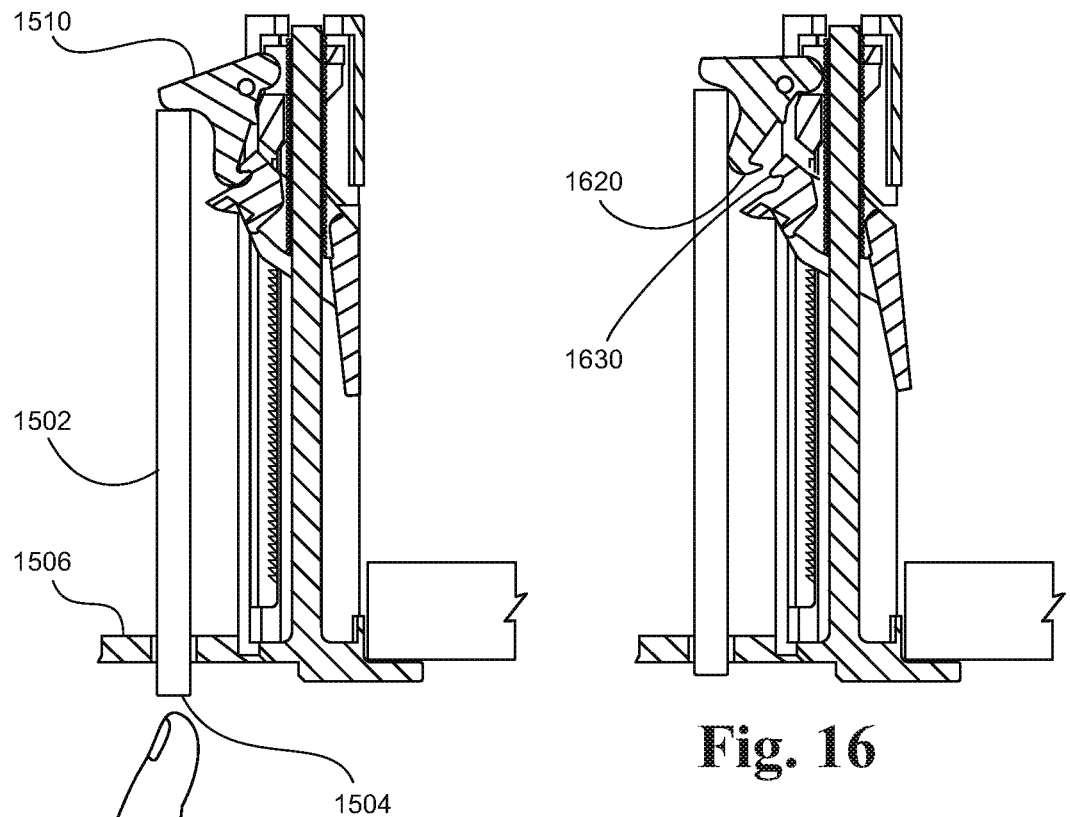
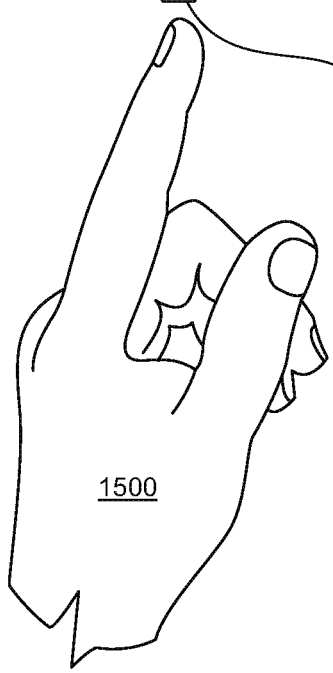
Fig. 15
Fig. 16
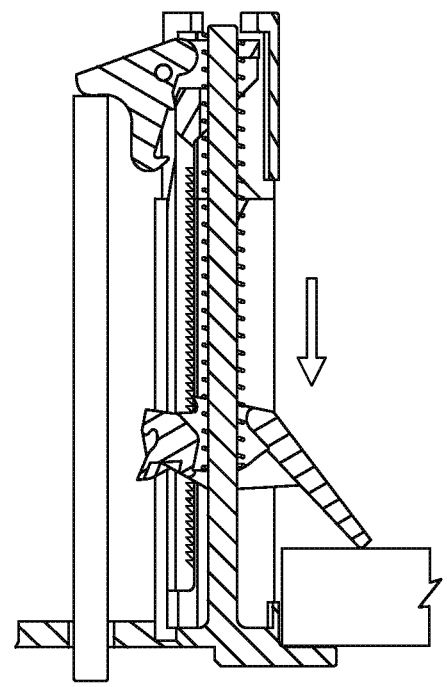
Fig. 17

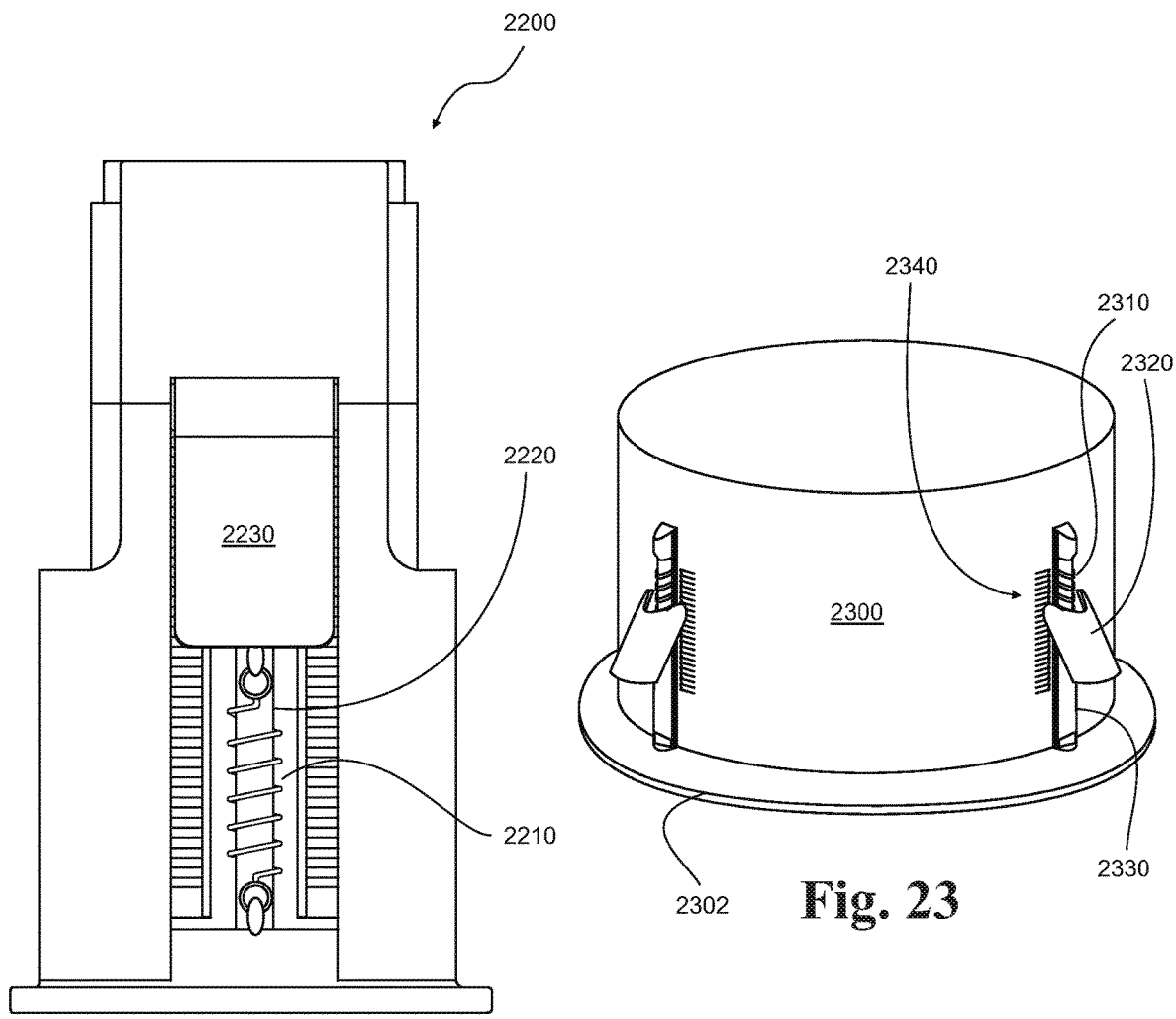

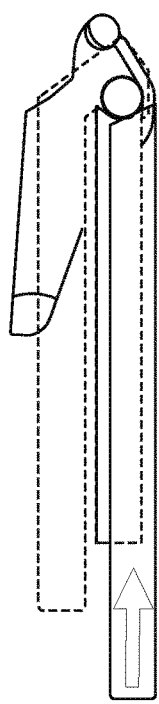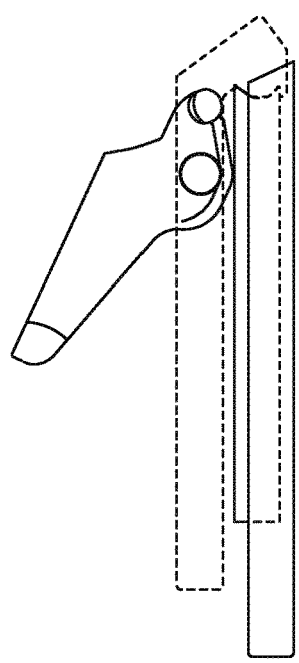
Fig. 41               Fig. 42
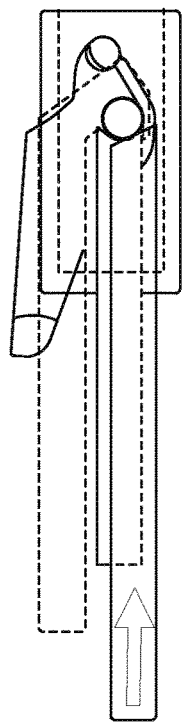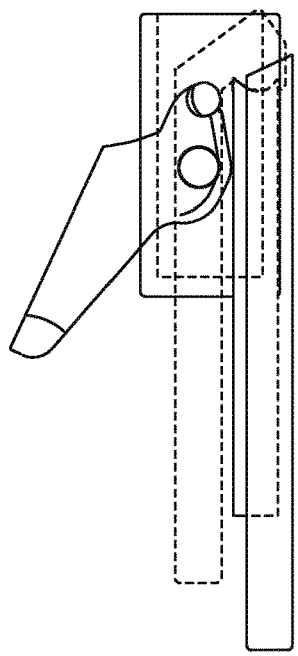
Fig. 43               Fig. 44

MOUNT ASSEMBLY AND SPEAKER MOUNT WITH SCREWLESS DOG

CROSS-REFERENCE TO RELATED APPLICATIONS

This invention claims priority, under 35 U.S.C. § 120, to the U.S. Provisional Patent Application Nos. 62/860,478 and 63/036,355 each by Hart et al. filed on 12 Jun. 2019 and 8 Jun. 2020, respectively, which are both incorporated by reference herein in their entireties.

BACKGROUND OF THE INVENTION

Field of the Invention

The present invention relates to mounts, specifically to mount assemblies and speaker mounts.

Description of the Related Art

Mounts are used to couple objects/devices (e.g. speakers, diffusers, decorative objects/devices, microphones, telephones, control panels, home automation devices, vents, fans, dispensers, cameras, security devices, surveillance devices, sensors, art, monitors/television screens, lighting, heat lamps) to surfaces, such as but not limited to walls, ceilings, desks, tables, barriers, dividers, and the like. Often a hole will be cut through the surface, with the hole sized to be large enough for the mount to couple through the hole and to the surface. The mount itself may include an aperture therethrough through which the object/device is coupled to the mount or the object/device may be integral to the mount. Generally, the mount will clamp to the surface at the edges of the hole through the surface. There is often a flange disposed around the mount that forms one side of the "clamp" on one side of the surface and then a "dog" that moves to press against the other side, thereby forming a clamping structure with the surface being coupled to being clamped therein.

A speaker or loudspeaker is a device containing one or more electro-acoustic transducers; which converts an electrical audio signal into a corresponding sound. The most widely used type of speaker today is the dynamic speaker, invented in 1925 by Edward W. Kellogg and Chester W. Rice. The dynamic speaker operates on the same basic principle as a dynamic microphone, but in reverse, to produce sound from an electrical signal. When an alternating current electrical audio signal is applied to its voice coil, a coil of wire suspended in a circular gap between the poles of a permanent magnet, the coil is forced to move rapidly back and forth due to Faraday's law of induction, which causes a diaphragm (usually conically shaped) attached to the coil to move back and forth, pushing on the air to create sound waves. Besides this most common method, there are several alternative technologies that can be used to convert an electrical signal into sound. The sound source (e.g., a sound recording or a microphone) must be amplified with an amplifier before the signal is sent to the speaker.

Speakers are typically housed in an enclosure which is often a circular, rectangular, or square box made of wood, metal, or sometimes plastic, and the enclosure plays an important role in the quality of the sound. Where high fidelity reproduction of sound is required, multiple loudspeaker transducers are often mounted in the same enclosure, each reproducing a part of the audible frequency range. In this case the individual speakers are referred to as "drivers" and the entire unit is called a loudspeaker. Drivers made for reproducing high audio frequencies are called tweeters, those for middle frequencies are called mid-range drivers, and those for low frequencies are called woofers. Smaller loudspeakers are found in devices such as radios, televisions, portable audio players, computers, and electronic musical instruments. Larger loudspeaker systems are used for music, sound reinforcement in theatres and concerts, and in public address systems.

In the related art, it has been known to use mounts and especially speaker mounts to couple objects/devices to surfaces. These mounts are sometimes difficult to install and/or sometimes fail to securely hold their associated objects/devices securely to the surface. Some improvements have been made in the field. Examples of references related to the present invention are described below in their own words, and the supporting teachings of each reference are incorporated by reference herein:

European Patent No. EP 2 746 643 by Koivisto discloses a fixing system for a recessed luminaire having a carrier frame for the luminaire with a cylindrical surface section which is oriented coaxial to a center axle of the carrier frame and which surrounds a recess opening for mounting the luminaire to the carrier frame and with a flat rim section protruding from the cylindrical surface section radially to the outside wherein the flat rim section provides a first contact surface of the fixing system for connecting the fixing system to an outer surface of a ceiling and a clamping unit attached to the carrier frame with a clamping element providing at least one second contact surface of the fixing system for connecting the fixing system to an inner surface of the ceiling.

U.S. Pat. No. 8,256,728, issued to Wright, discloses speaker assemblies that are configured for simple installation and removal. Speaker assemblies include a gear ring, a plurality of screws adapted to rotate when the gear ring is rotated, and a latching mechanism adapted to extend one or more latches outward when the screws are rotated. Methods of installing speaker assemblies include inserting a frame through a mounting hole in a mounting panel. A gear ring coupled to a plurality of screws is rotated, and a plurality of latches extend outward to engage a back-side surface of the mounting panel. Methods of making speaker assemblies include coupling a plurality of screws with a gear ring to enable rotation of the plurality of screws upon rotation of the gear ring. A latching mechanism is coupled to each of the plurality of screws.

U.S. Pat. No. 9,028,309, issued to Rimmer, discloses a mounting flange for attaching an HVAC air diffuser terminal in an opening in a floor or other mounting surface. The mounting flange includes a trim ring and a flange clip. The flange clip is adjustably and movably received in a slot defined a side of the trim ring. A pawl on the flange clip engages with ratchets defined in a surface of the trim ring adjacent to the slot to maintain the flange clip in selected position relative the underside of a floor. The air diffuser terminal is secured in the floor opening between gripping surfaces on the flange clip and the trim ring. An optional screw operably connects the flange clip with the trim ring so that the diffuser may be securely tightened in the floor opening.

U.S. Patent Application Publication No.: 2013/0,039,082, by Fleischer et al., discloses a vehicle light, which may be a third brake light, includes an insertion portion for inserting in a recess of a vehicle component and a contact portion for placing the brake light on an edge of the recess. The contact portion protrudes at least in sections past the side of the insertion portion, wherein the insertion portion has at least one catch element designed for catching the brake light on the vehicle component. The insertion portion further has at least one locking element for sliding the at least one catch element in the direction of the contact portion. The locking element is implemented as a lever. The method can be used for installing such a vehicle light, in particular a brake light.

The inventions heretofore known suffer from a number of disadvantages which include: requiring complicated parts, requiring screws and/or the operation of screw devices to secure/clamp to a surface, requiring tools for installation/removal, binding too tightly on surfaces, failing to engage/trigger on install, being too loose when fully installed, requiring two installers to mount to a surface, being difficult to uninstall/remove, leaving marks/damage on surfaces (especially when uninstalled), having complicated trigger mechanisms/actuations, being prone to breakage, being difficult to manufacture, being heavy, being prone to failure and taking too long to install.

What is needed is a mount, mount assembly, and/or speaker mount that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available mounts, mount assemblies, and speaker mounts Accordingly, the present invention has been developed to provide a mount, mount assembly, and/or speaker mount.

There may be a mount, mount assembly, and or a speaker mount. The mount, mount assembly, and/or speaker mount may include one or more of: a mount body and/or a speaker baffle which may include a flange; a tower assembly that may protrude from a backside of the speaker baffle or mount body, the tower assembly including one or more of: a dog, which may include one or more of: a dog body; and a foot extending from the dog body; a bias member that may extend lengthwise along the tower assembly and/or be functionally coupled to the dog, thereby biasing the dog towards the speaker baffle or mount body; a path guide that may extend lengthwise along the tower assembly and/or be functionally coupled to the dog such that the dog travels lengthwise along the tower assembly (it may be that the path guide allows the dog to be oriented according to one or more of: a first orientation wherein the foot is pointed directly towards the speaker baffle or mount body and/or is substantially aligned with a lengthwise orientation of the tower assembly such that the foot does not interfere with travel of the mount, mount assembly, or speaker mount through an aperture when the dog is in a first position that is spaced away from the mount body or speaker baffle; and a second orientation wherein the foot is not pointed directly towards the mount body or speaker baffle and/or substantially unaligned with the lengthwise orientation of the tower assembly such that the foot does interfere with travel of the mount, mount assembly, or speaker mount through an aperture when the dog is in a second position that is spaced closer to the mount body or speaker baffle than the first position, wherein the dog changes from the first position to the second position by operation of the bias member and/or not by operation of a screw); and a trigger that may be in functional communication with the dog when the dog is in the first position. There may also be a bias member guide that may extend lengthwise along the tower assembly that traps the bias member in an orientation lengthwise along the tower assembly. There may also be an array of teeth that may face a backside of the dog body when the dog body is in the second position that mate with a dog tooth of the dog body. There may also be a cap that may cover a top of the tower assembly (it may be that the cap restricts a teeth body from exiting the top of the tower assembly) and/or the teeth body may include an array of serrated protrusions. There may be a tower void that may be in an interior of the tower assembly and/or it may be that within which the bias member and/or a portion of the dog body is disposed. There may be a path tab that may extend from the dog body mating with the path guide.

It may be that the bias member guide is a pillar about which the bias member is disposed. It may be that the dog body is a spring cup that may be mated with the bias member and/or it may be that the foot is rotatably coupled to the spring cup. It may be that the dog a single formed body without articulating members. It may be that the path tab is elongated orthogonal to an axis of protrusion from the dog body and/or it may be that the path guide includes a curved region at a top of the path guide thereof that may be sized to force the path tab to rotate when the dog is in the first position.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawing(s). It is noted that the drawings of the invention are not to scale. The drawings are mere schematics representations, not intended to portray specific parameters of the invention. Understanding that these drawing(s) depict only typical embodiments of the invention and are not, therefore, to be considered to be limiting its scope, the invention will be described and explained with additional specificity and detail through the use of the accompanying drawing(s), in which:

FIGS. 15-17 are side cross-sectional elevational views of a tower assembly and an edge of a hole through a surface showing manual triggering, via an external button press, from a first mode to a second mode, wherein a dog transitions from a first orientation to a second orientation, according to one embodiment of the invention;

FIG. 22 is a front elevational view of a tower assembly including a tension spring as a bias member, according to one embodiment of the invention;

FIG. 23 is a side perspective view of mount assembly showing a dog, bias member, path guide, and array of teeth all external to a tower, according to one embodiment of the invention;

FIGS. 34 and 35 are side elevational views of a two-piece dog having a high degree of rotation during the "flip-out" and "flip-in" actions, according to one embodiment of the invention, wherein FIG. 34 shows a first orientation and FIG. 35 shows a second orientation wherein the dog finger is engaged with a backside of a surface;

FIGS. 41-44 show operation of a button shaft dislodging a dog from a shelf of a non-linear path guide and thereby triggering the dog to flip outward and downward along the path guide, according to one embodiment of the invention.

DETAILED DESCRIPTION OF THE INVENTION

Figure 1:
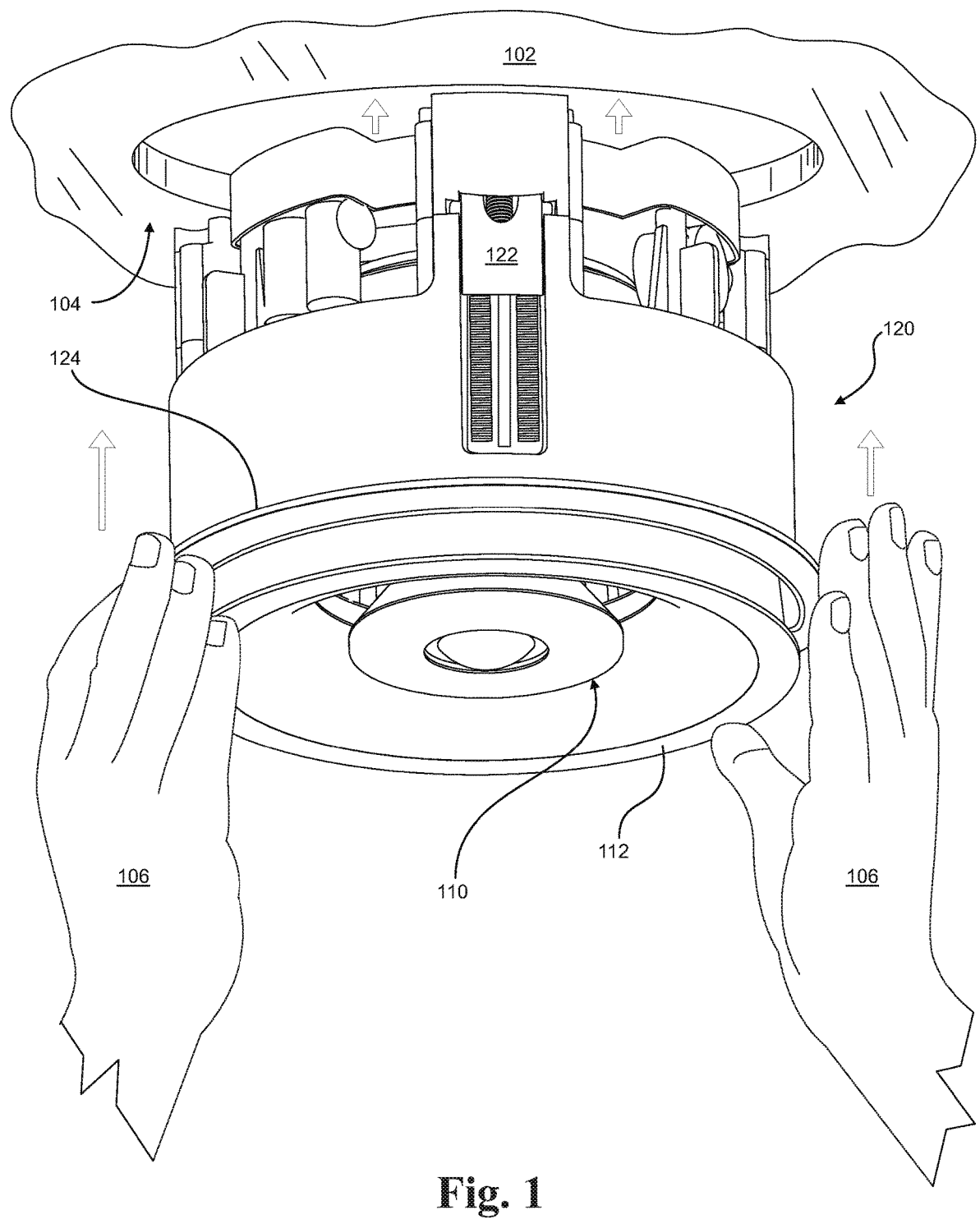
FIG. 1 is a side perspective view of a speaker mount having a speaker disposed therein being lifted into a hole through a ceiling, according to one embodiment of the invention.

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to an "embodiment," an "example" or similar language means that a particular feature, structure, characteristic, or combinations thereof described in connection with the embodiment is included in at least one embodiment of the present invention. Thus, appearances of the phrases an "embodiment," an "example," and similar language throughout this specification may, but do not necessarily, all refer to the same embodiment, to different embodiments, or to one or more of the figures. Additionally, reference to the wording "embodiment," "example" or the like, for two or more features, elements, etc. does not mean that the features are necessarily related, dissimilar, the same, etc.

Each statement of an embodiment, or example, is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The features, functions, and the like described herein are considered to be able to be combined in whole or in part one with another as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

FIG. 1 is a side perspective view of a speaker mount 120 having a speaker 110 disposed therein being lifted into a hole through a surface 102 (illustrated as a ceiling), according to one embodiment of the invention. There is a speaker body 112 partially inserted into the speaker mount, both being lifted by hands 106 of an installer into a hole sized such that the illustrated flange 124 extending from the speaker baffle overlaps an edge 104 of the hole through the surface. A dog 122 is positioned and oriented at a side of the speaker mount so as to be ready to deploy and so as to not interfere with insertion of the speaker mount through the hole in the surface. Generally, a plurality of such dogs are positioned about a perimeter of the baffle such that in final installation, the surface is clamped at multiple points for a secure coupling.

In the illustrated embodiment, no tools are needed to complete the installation of the speaker into the ceiling as the dogs are triggered to clamp down on the backside of the ceiling as the speaker body is fully inserted into the interior of the speaker mount baffle. See FIGS. 2 and 8-11 for non-limiting exemplary embodiments of such triggering mechanisms. Additionally, the face of the speaker and speaker mount have no controls, protrusions, holes, or other evidence of installation hardware other than the flange itself, which creates a clean and simple install aesthetic while still providing a secure coupling.

Figure 2:
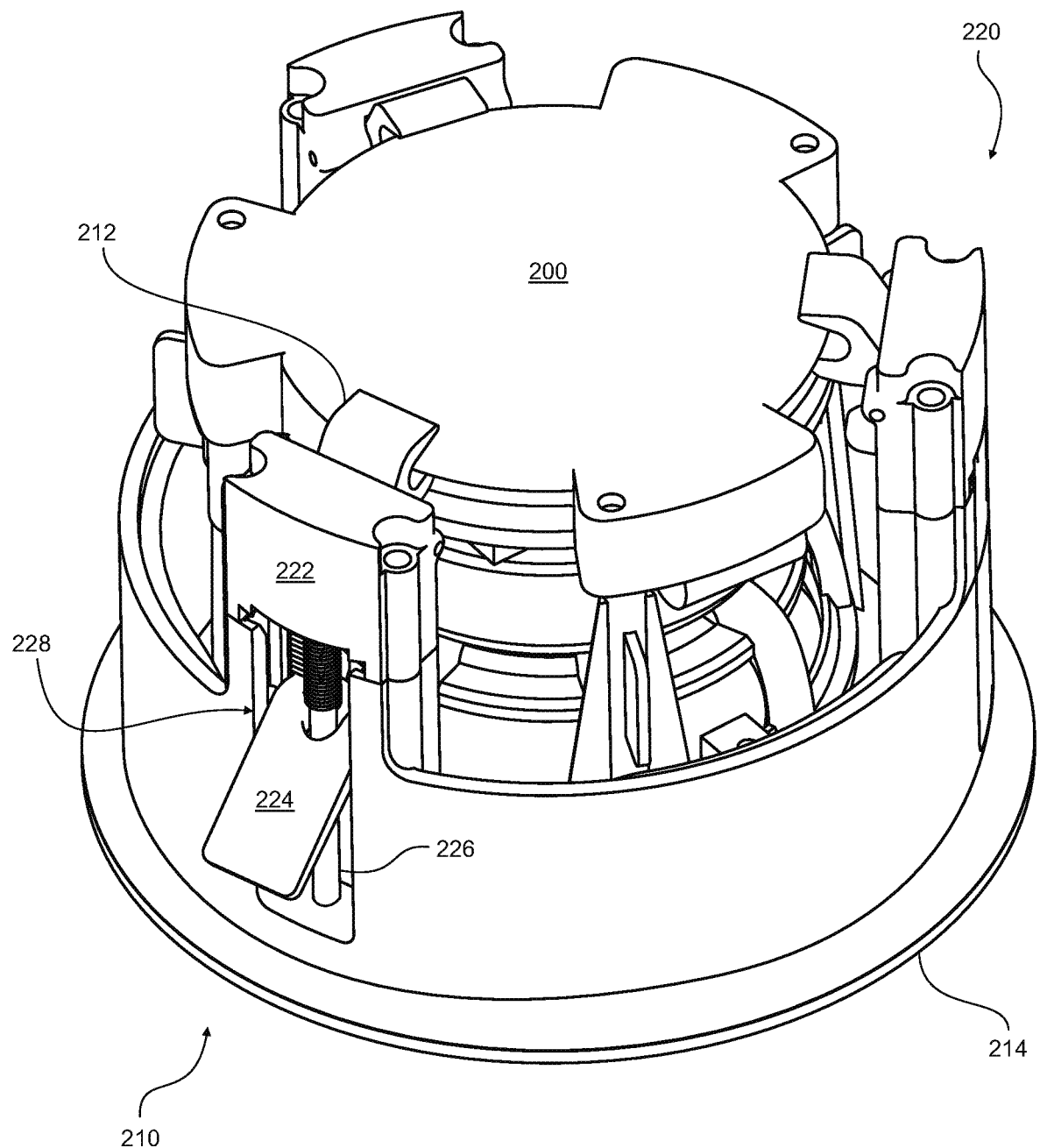
FIG. 2 is a side perspective view of a mount assembly including a device, according to one embodiment of the invention.

FIG. 2 is a side perspective view of a mount assembly 210 including a device 200, according to one embodiment of the invention. The illustrated mount assembly includes a flange 214 circumscribing a baffle thereof with a tower assembly 220 protruding orthogonally therefrom. The tower assembly includes a dog 224 and a cap 222 that covers a void 228 within which a path guide 226 is disposed (the boundaries of the void formed by the body of the tower assembly also form a part of the illustrated path guide as they confine the illustrated dog to a particular path of travel, including orientation confinement). The illustrated path guide also serves to confine travel, position and orientation of the illustrated spring encircling the path guide. The illustrated tower assembly also includes a trigger 212 that is coupled to an edge of the device.

As used herein, the term "path guide" is an open term, as there are often several parts, pieces, components, structures, etc. that cooperate to confine the illustrated dogs to particular paths of travel and orientation. Accordingly, where any particular structure is pointed out as a "path guide" that does not mean that there are no other path guides or path guide structures. Further, many but not all of the path guides illustrated herein serve to confine one or more bias members and so could also be called a spring guide. For simplicity, the term path guide is used in order to focus attention on the travel of the various dogs described herein. The illustrated path guide and bias member guide is a pillar about which the bias member is disposed.

The illustrated device includes structure consistent with a backside of a speaker, but it may be a speaker, diffuser, decorative object/device, microphone, telephone, control panel, home automation device, vent, fan, dispenser, camera, security device, surveillance device, sensor, art, monitor/television screen, lighting, heat lamp, or the like or combinations thereof. The device includes a back plate shaped and sized to engage with the triggers of the tower assemblies so that full insertion of the device into the mount assembly engages with the triggers in a manner to fully engage the same (e.g. See FIG. 11).

Figure 3:
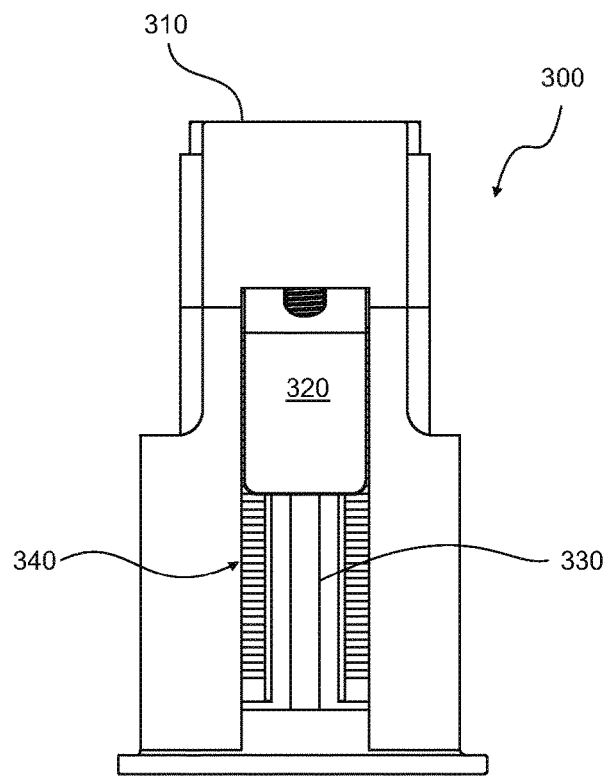
FIG. 3 is a front elevational view of a tower assembly in a first mode with a dog in a first orientation, according to one embodiment of the invention, with FIG. 4 being a side view thereof.
Figure 4:
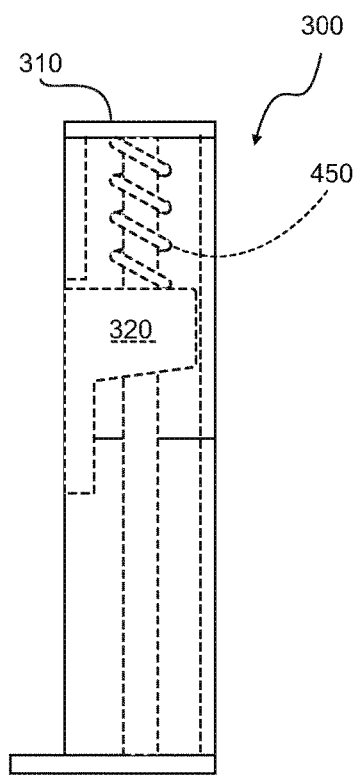

FIG. 3 is a front elevational view of a tower assembly 300 in a first mode with a dog 320 in a first orientation, according to one embodiment of the invention, with FIG. 4 being a side view thereof. The illustrated tower assembly includes a cap 310 disposed over a path guide 330 encircled at a top thereof by a bias member 450. There is shown an array of teeth 340 disposed within a void of the tower assembly. The illustrated bias member extends lengthwise along the tower assembly and is functionally coupled to the dog, thereby biasing the dog towards the speaker baffle or mount body.

The illustrated bias member is a compression spring disposed around a top region of the pillar-shaped path guide. The compression spring is bounded by the cap so that when the dog is in a first position the compression spring is compressed. In alternative embodiments the bias member(s) may be a tension spring, leaf spring, torsion spring, constant force spring, drawbar spring, volute spring, garter spring, flat spring, gas spring, and/or air spring and the like and combinations thereof.

The illustrated path guide (which may include the slot through the tower assembly through which the dog protrudes in the second orientation and/or including any slots/grooves through which a path tab may extend) extends lengthwise along the tower assembly and is functionally coupled to the dog such that the dog travels lengthwise along the tower assembly. The illustrated path guide allows the dog to be oriented according to: a first orientation wherein the foot is pointed directly towards the mount body and is substantially aligned with a lengthwise orientation of the tower assembly such that the foot does not interfere with travel of the mount/mount assembly through an aperture when the dog is in a first position that is spaced away from the mount body; and a second orientation wherein the foot is not pointed directly towards the mount body and is substantially unaligned with the lengthwise orientation of the tower assembly such that the foot does interfere with travel of the mount/mount assembly through an aperture when the dog is in a second position that is spaced closer to the mount body than the first position.

It is noted that the illustrated dog changes from the first position to the second position by operation of the bias member and not by operation of any screw. In particular, the travel of the dog along the path guide is not powered/driven by any screw, even if non-illustrated embodiments included a screw for other purposes (e.g. to couple a flange to a baffle). This is true for all embodiments illustrated herein.

Figure 5:
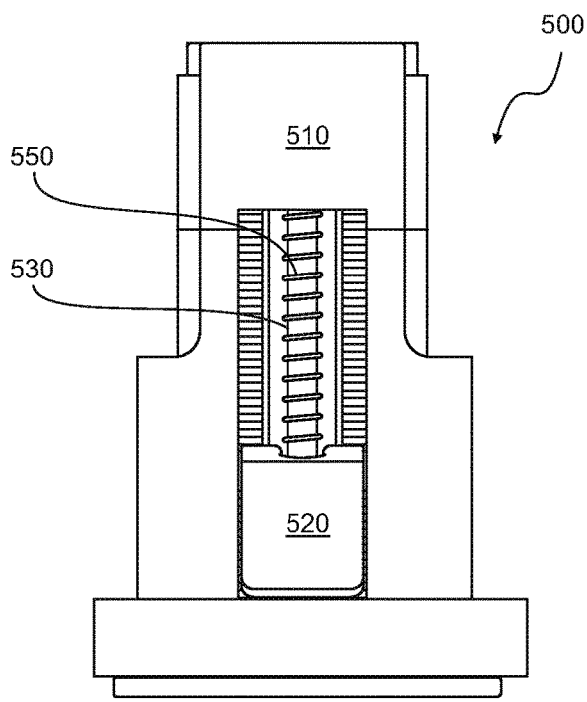
FIG. 5 is a front elevational view of a tower assembly in a second mode with a dog in a second orientation, according to one embodiment of the invention, with FIG. 6 being a side view thereof.
Figure 6:
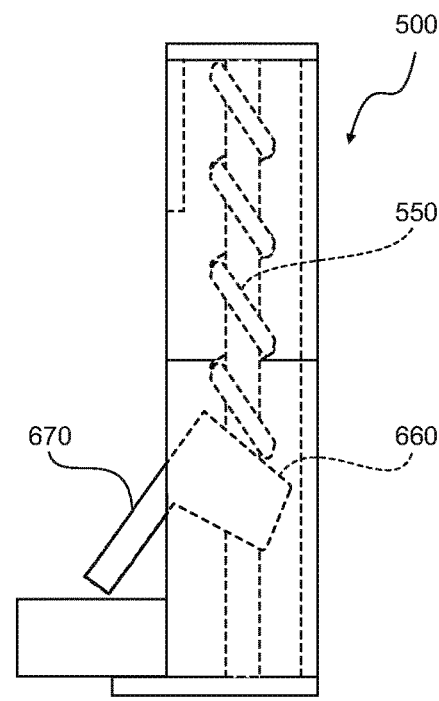

FIG. 5 is a front elevational view of a tower assembly 500 in a second mode with a dog 520 in a second orientation, according to one embodiment of the invention, with FIG. 6 being a side view thereof. It may be that the tower assembly 500 of FIG. 5 is the same tower assembly of FIGS. 3 and 4. There is shown a cap 510 enclosing a void of the tower assembly and holding a path guide 530 encircled by a bias member 550 in place therein. An array of teeth 540 is adjacent a dog body 660 of the dog that is biased towards a base of the tower assembly by the bias member (illustrated as a compression spring), while the dog finger 670 is disposed over a backside of a surface trapping the surface between the dog finger and a flange.

Figure 7:
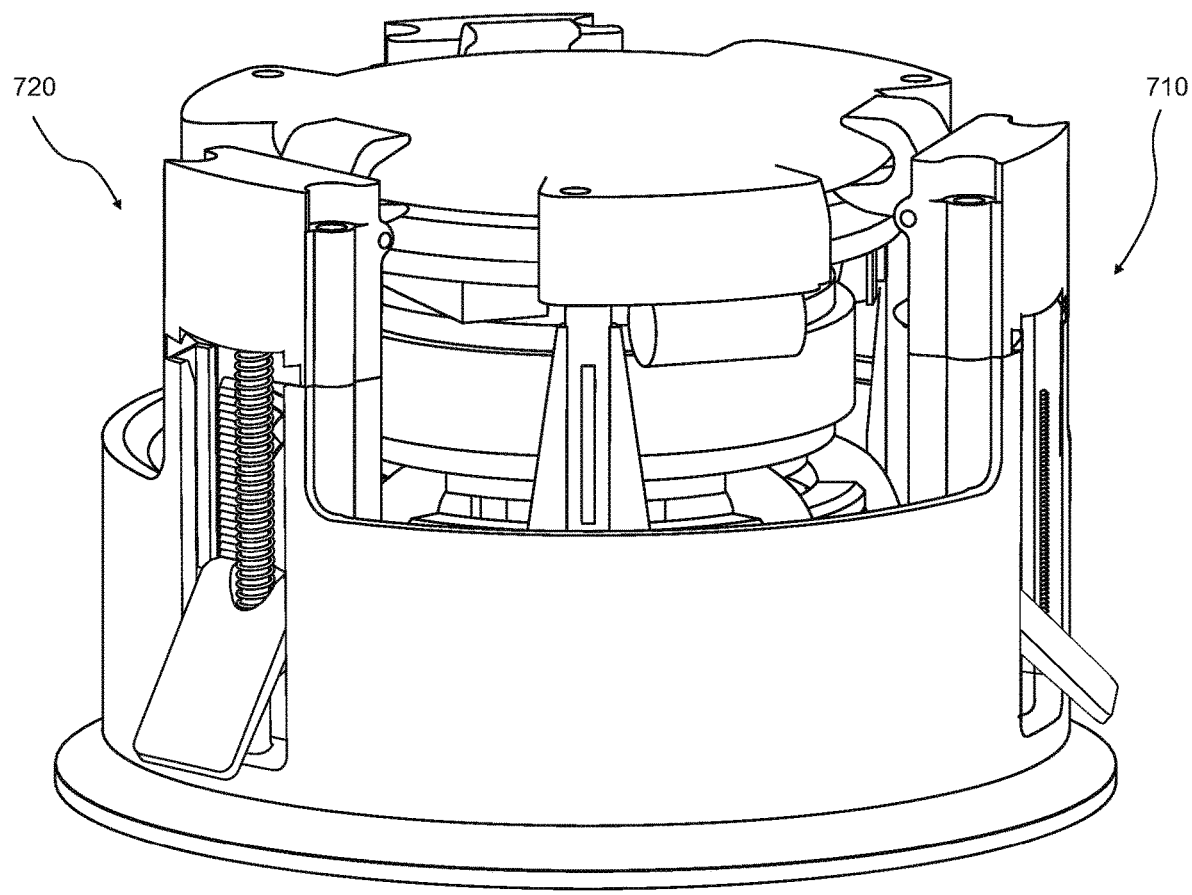
FIG. 7 is a side perspective view of a mount assembly including a device showing two dogs in a second orientation, according to one embodiment of the invention.
Figure 8:
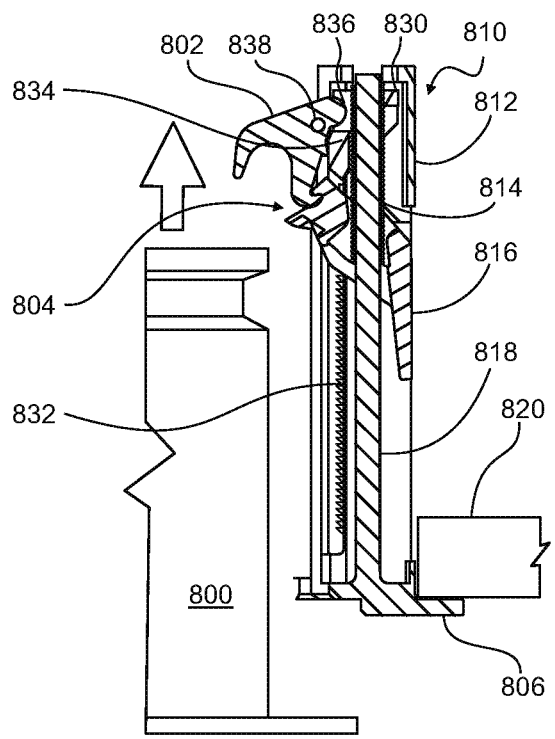
FIGS. 8-11 are partial side elevational partial cross-sectional views of a mount assembly, showing a device body in various stages of engagement with a trigger of a tower assembly, according to one embodiment of the invention.
Figure 9:
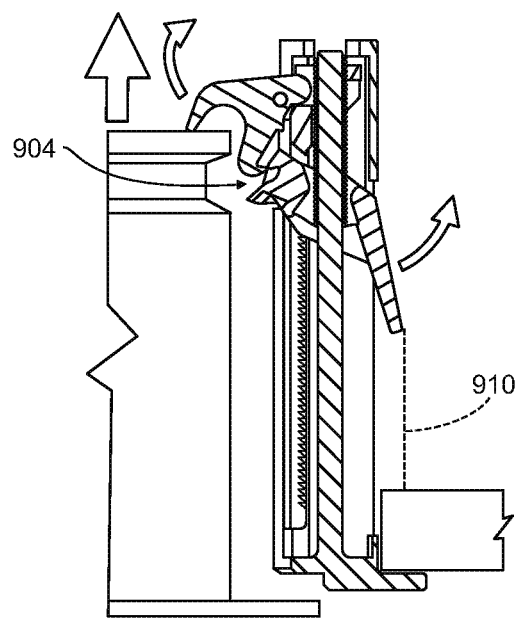
Figure 10:
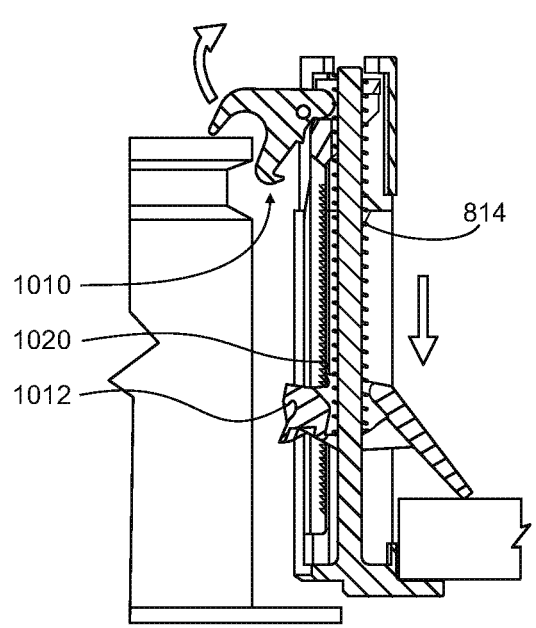
Figure 11:
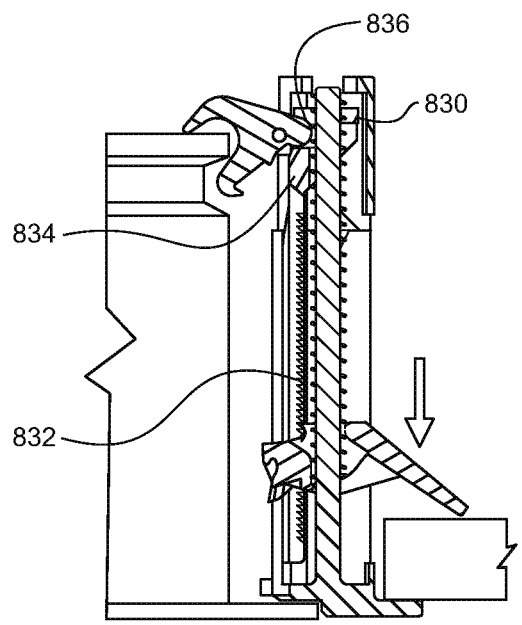

FIG. 7 is a side perspective view of a mount assembly including a device showing a pair of dogs 710, 720 in a second orientation, according to one embodiment of the invention.

FIGS. 8-11 are partial side elevational partial cross-sectional views of a mount assembly, showing a device body 800 in various stages of engagement with a trigger 802 of a tower assembly 810 having a cap 812 at a top thereof as the mount assembly enters through an aperture in a baffle of the mount assembly that extends through an aperture in a surface 820 and engages therewith via a flange 806, according to one embodiment of the invention. The illustrated cap restricts a teeth body from exiting the top of the tower assembly as the illustrated teeth body is biased upward since the bias member braces thereagainst opposite the dog.

The illustrated trigger is in functional communication with the dog when the dog is in the first position. The trigger pivots about a cam pivot 838 and includes a cam 836 that engages (as the trigger lifts by engagement with the entering device body) with a cam follower 834 coupled to a teeth body 830 having an array of teeth 832 (array of serrated protrusions). As the trigger lifts, a latch assembly 804 disengages 904 and the dog flips-outward and snaps down against the surface, pinning the surface against the flange. Under force of a bias member 814 encircling a top region of a path guide 818 the dog, having a dog finger 816, is freed from confinement to a first orientation wherein the dog finger is "out of the way" of the hole through the surface and rotates to extend outside of the tower assembly such that an imaginary drop-line 910 from the tip of the dog finger extends over a backside of the surface and the dog begins to descend theretoward. The illustrated path guide is also a bias member guide that extends lengthwise along the tower assembly and that traps the bias member in an orientation lengthwise along the tower assembly.

The illustrated latch assembly has a first latch hook 1010 that cooperatively engages with a second latch hook 1012. The dog includes a tooth prong (dog tooth) at a backside thereof that engages with the array of teeth when the dog is in a second orientation. As the cam further engages with the cam follower while the device body is being pushed the final distance into full engagement with the mount assembly, the teeth body slides downwards, towards the flange which cause the array of teeth to also slide downward while engaged with the tooth prong of the dog body, which presses the dog finger harder against the backside of the surface forming a more secure clamping thereto.

Figures 12, 13:
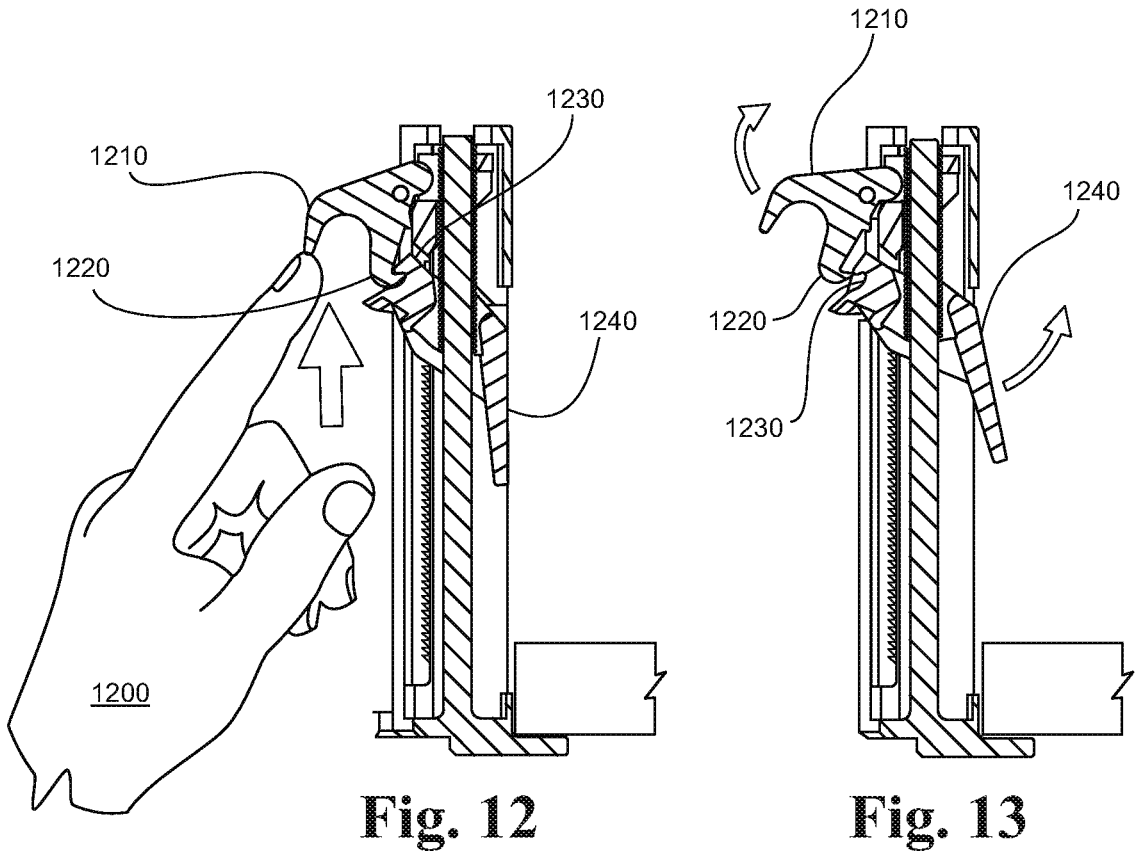
FIGS. 12-14 are side cross-sectional elevational views of a tower assembly and an edge of a hole through a surface showing manual triggering, via an internal lever press, from a first mode to a second mode, wherein a dog transitions from a first orientation to a second orientation, according to one embodiment of the invention.
Figure 14:
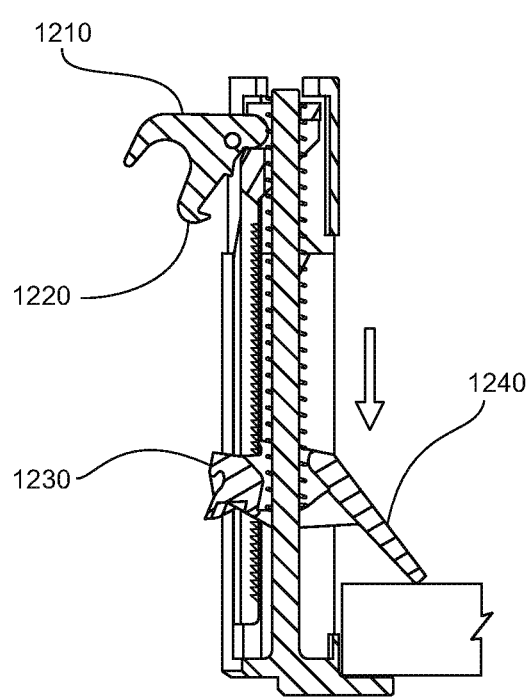
Figure 18:
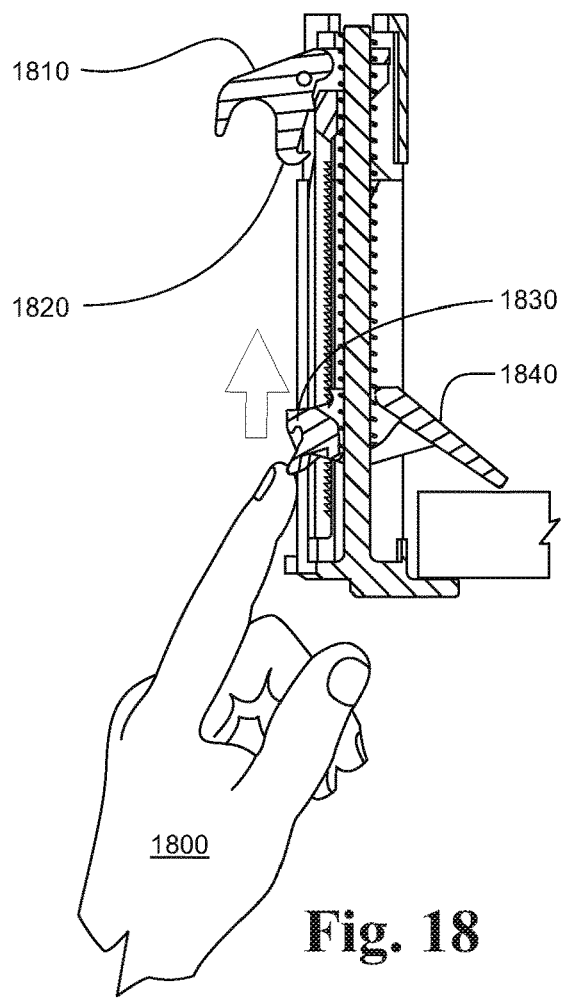
FIGS. 18-21 are side cross-sectional elevational views of a tower assembly and an edge of a hole through a surface showing manual dog reset, via an internal protrusion press, from a second mode to a first mode, wherein a dog transitions from a second orientation to a first orientation, thereby allowing removal of an associated mount from a hole through a surface, according to one embodiment of the invention.
Figure 19:
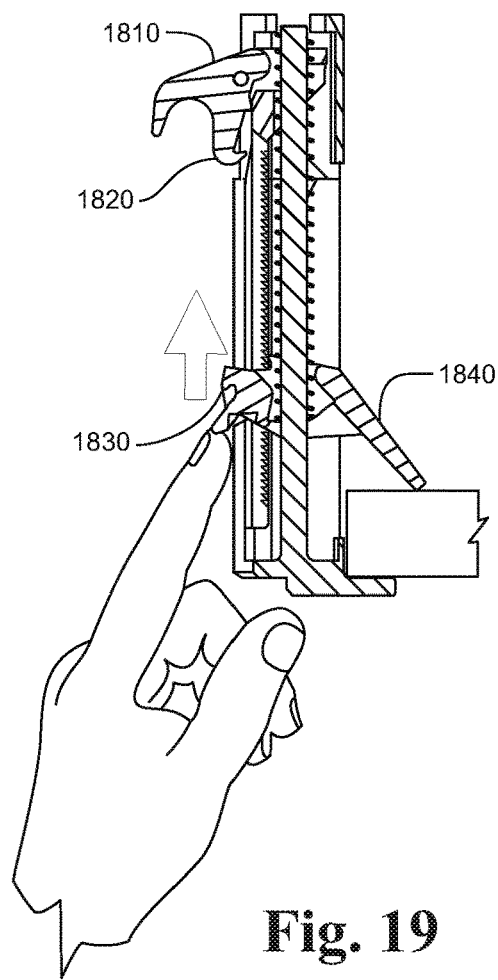
Figure 20:
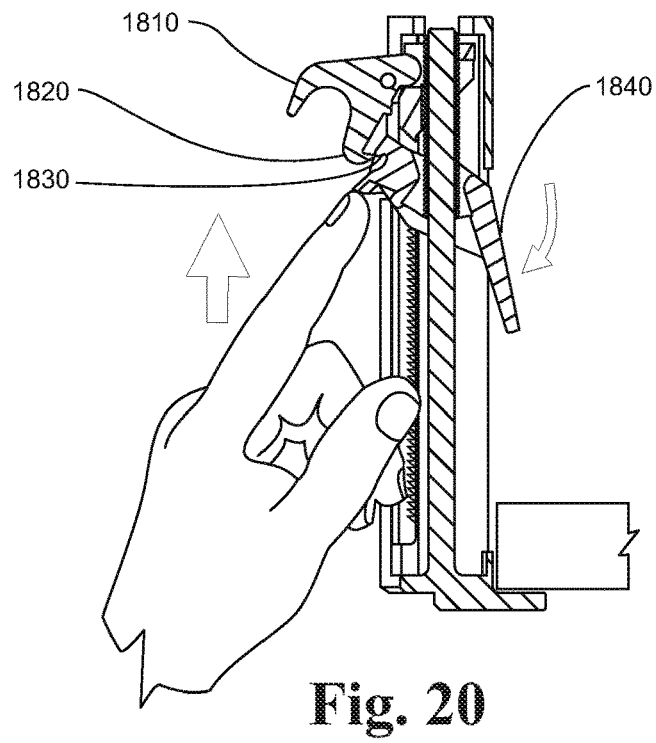
Figure 21:
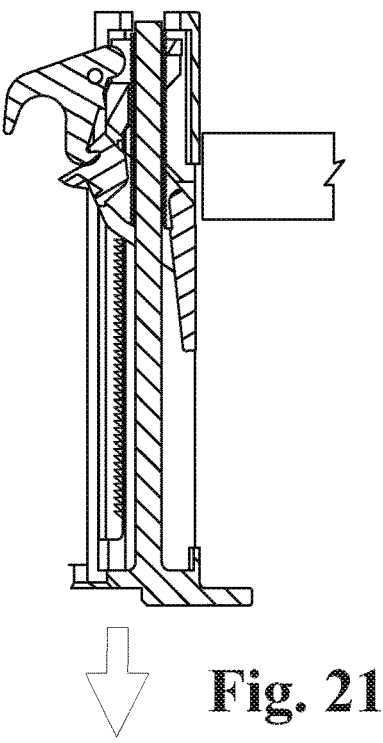

FIGS. 12-14 are side cross-sectional elevational views of a tower assembly and an edge of a hole through a surface showing manual triggering, via an internal lever press, from a first mode to a second mode, wherein a dog transitions from a first orientation to a second orientation, according to one embodiment of the invention. The illustrated trigger 1210 is engaged with the hand 1200 of the operator to lift the trigger and thereby disengage the first latch hook 1220 from the second latch hook 1230 thereby freeing the dog and allowing the dog finger to rotate upwardly and away from the tower assembly.

FIGS. 15-17 are side cross-sectional elevational views of a tower assembly and an edge of a hole through a surface showing manual triggering, via an external button press, from a first mode to a second mode, wherein a dog transitions from a first orientation to a second orientation, according to one embodiment of the invention. The user's hand 1500 presses a button 1504 protruding through a faceplate 1506 of a mount assembly, the button being an end of a button shaft extending to a trigger 1510 such that pressing the button lifts the trigger which disengages a first latch 1620 from a second latch 1630 which releases a dog coupled to the second latch to flip out and snap down under bias from a bias member and clamp to the surface in cooperation with a flange.

FIGS. 18-21 are side cross-sectional elevational views of a tower assembly and an edge of a hole through a surface showing manual dog reset, via an internal protrusion press, from a second mode to a first mode, wherein a dog transitions from a second orientation to a first orientation, thereby allowing removal of an associated mount from a hole through a surface, according to one embodiment of the invention. The hand 1800 of an operator is able to reset a trigger for a dog by reaching through an aperture formed by a baffle of a mount assembly to engage with a protrusion extending from a backside of a dog.

The dog thereby slides up the path guide until the first latch hook 1820 and the second latch hook 1830 engage with each other and thereby latch together. This resets the trigger 1810 so that it may be triggered at a later time. It also lifts the dog finger 1840 from a backside of the surface thereby unclamping the surface from the mount. A path guide, combined with an x-shaped hollow interior of the dog allows and causes the dog to rotate at a top of the path guide so that the dog finger rotates inwards towards the tower assembly and thereby retracts from being in the way. Accordingly, the mount assembly may be extracted out of the hole through the surface without damage to any of the structures involved and without requiring any tools.

FIG. 22 is a front elevational view of a tower assembly 2200 including a tension spring 2210 as a bias member, according to one embodiment of the invention. The illustrated tension spring encircles a path guide 2220 and is coupled to a dog 2230. When the dog is in a first position, the tension spring is pulled away from rest position and therefore biases the dog towards the flange, such that when the dog is released by a trigger the dog is pulled towards the flange. In a similar embodiment, a leaf spring disposed along the side of the tower assembly or pinned behind the tower assembly at one end and coupled at a top/bottom of a dog could either push/pull the dog towards the flange when the dog is released.

FIG. 23 is a side perspective view of mount assembly showing a dog 2320 (flipped out to be over a flange 2302), bias member 2310, path guide 2330, and array of teeth 2340 all external to a tower body 2300, according to one embodiment of the invention. There is a single tower body (the central baffle extending upward from the flange) to which a plurality of path guides and dog couples are attached to an exterior thereof. The tower body supports each couple and also provides a surface from which an array of teeth may protrude and beneficially interact with the associated dog.

Figure 24:
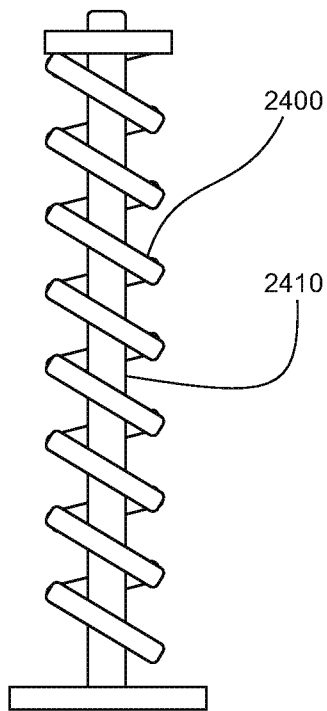
FIGS. 24-27 are side elevational views of variations on path guide structures and associated bias members, according to various embodiments of the invention.
Figure 25:
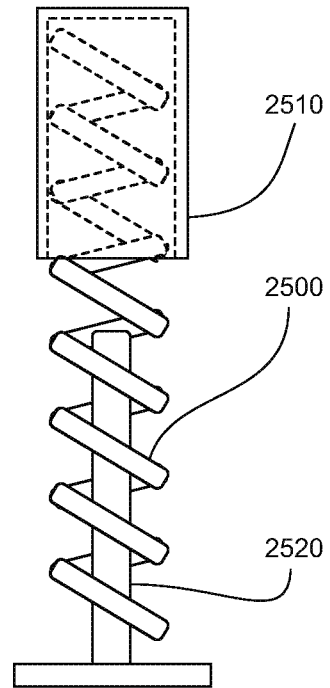
Figure 26:
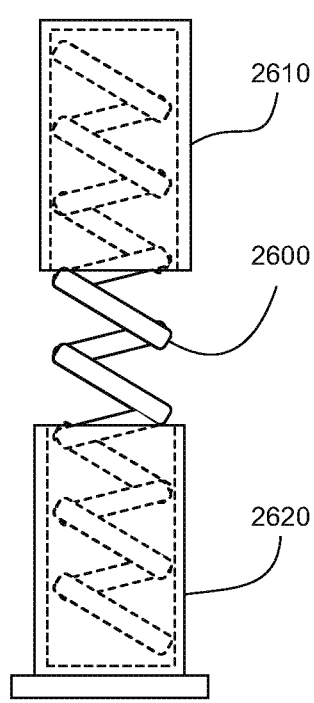
Figure 27:
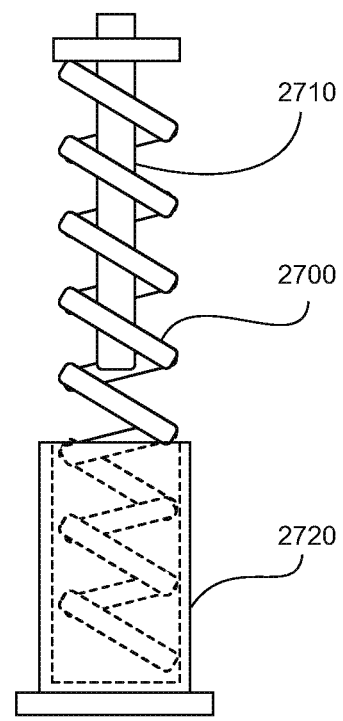

FIGS. 24-27 are side elevational views of variations on path guide structures and associated bias members, according to various embodiments of the invention. In particular, FIG. 24 shows a bias member 2400 encircling a shaft path guide 2410, FIGS. 25 and 27 each show a bias member 2500, 2700 partially enclosed by a spring cup 2510, 2720 and encircling a shaft path guide 2520, 2710 (FIGS. 25 and 27 each being mirror images of each other), and FIG. 26 shows a bias member 2600 partially enclosed by each of a first spring cup 2610 and a second spring cup 2620. The various illustrated embodiments show alternative ways to couple coil springs to features within a tower assembly. The illustrated bottom spring cups may form dog bodies and/or be coupled thereto (e.g. See FIGS. 28-31). The illustrated structures may be disposed within tower voids.

Figures 28, 29:
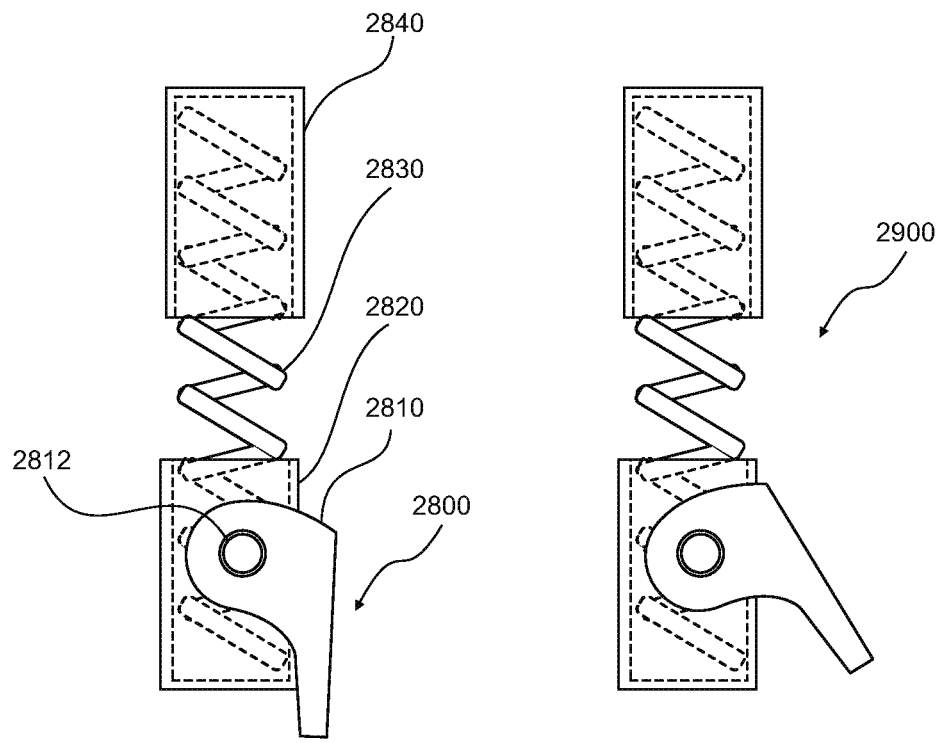
FIG. 28 is a side elevational view of an assembled bias member with top spring cup and two-piece dog with the dog in a first orientation, according to one embodiment of the invention, FIG. 29 being the same with the dog in a second orientation.

FIG. 28 is a side elevational view of an assembled bias member 2830 with a top spring cup 2840 and two-piece dog 2820 (combined dog and spring cup) with the dog in a first orientation 2800, according to one embodiment of the invention, FIG. 29 being the same with the dog in a second orientation 2900. The illustrated dog finger 2810 is coupled to the combo-dog body and bottom spring cup via a dog-finger pivot 2812.

Figures 30, 31:
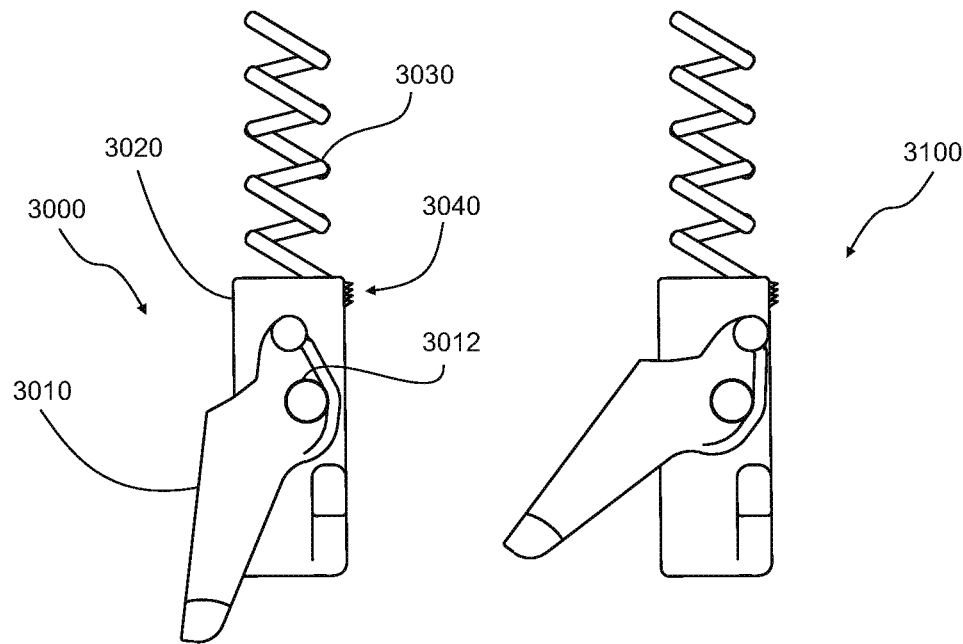
FIG. 30 is a side elevational view of an assembled bias member and two-piece dog with the dog in a first orientation, according to one embodiment of the invention, FIG. 31 being the same with the dog in a second orientation.

FIG. 30 is a side elevational view of an assembled bias member 3030 and two-piece dog 3020 having tooth prongs 3040 with the dog in a first orientation 3000, according to one embodiment of the invention, FIG. 31 being the same with the dog in a second orientation 3100 wherein the dog finger 3010 is flipped outward.

Figure 32:
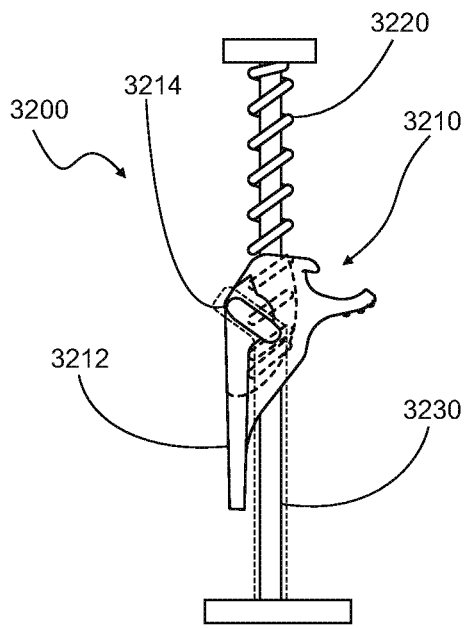
FIG. 32 is a side elevational view of an assembled bias member and one-piece dog with the dog in a first orientation, according to one embodiment of the invention, FIG. 33 being the same with the dog in a second orientation.
Figure 33:
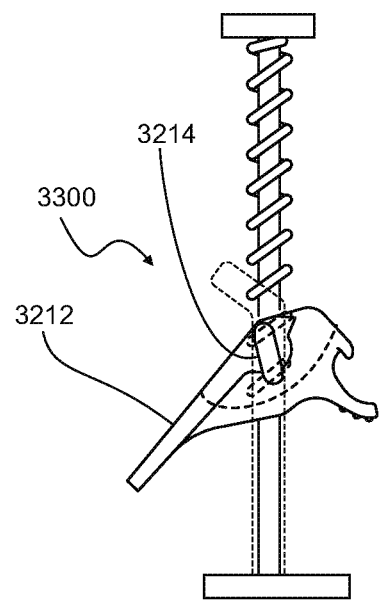

FIG. 32 is a side elevational view of an assembled bias member 3220 encircling a top region of a path guide 3230, and one-piece dog 3210 having a dog finger 3212 and a path tab 3214 with the dog in a first orientation 3200, according to one embodiment of the invention, FIG. 33 being the same with the dog in a second orientation 3300. The illustrated dog is a single formed body without articulating members. The illustrated path tab is elongated orthogonal to an axis of protrusion.

It may be that the illustrated path tab may extend from the dog body mating with the path guide. As a non-limiting example, there may be a path guide as a slot through an interior side of the tower assembly that may be widened and/or curved at a top region such that the illustrated path tab is forced to be oriented as shown in FIG. 32, while the path guide through which the path tab travels may be narrower near a bottom region thereof, such that the path tab is forced to be oriented as shown in FIG. 33, since the illustrated path tab is elongated. Such facilitates in the "flip-out" and "flip-in" action and orientation of the illustrated dog.

Figure 34:
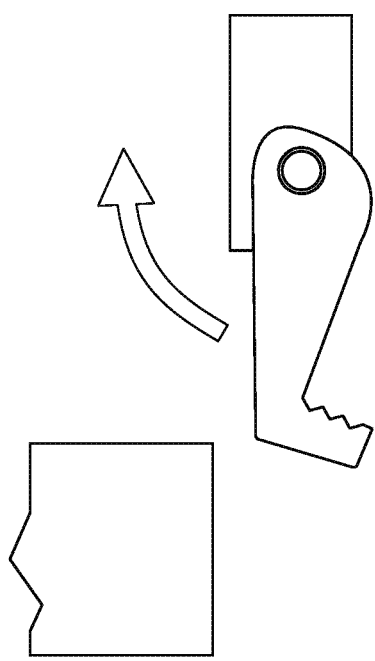
Figure 35:
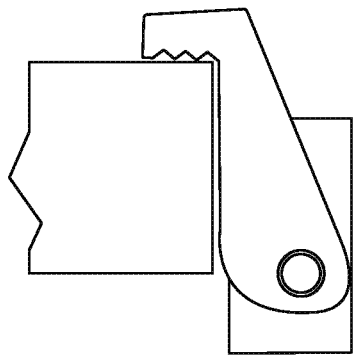

FIGS. 34 and 35 are side elevational views of a two-piece dog having a high degree of rotation during the "flip-out" and "flip-in" actions, according to one embodiment of the invention, wherein FIG. 34 shows a first orientation and FIG. 35 shows a second orientation wherein the dog finger is engaged with a backside of a surface. In the illustrated embodiment the dog body, when fully deployed, rests partially below the surface, which may require an aperture or cut-out in a flange. There may be a torsion spring disposed within the dog body that biases the dog finger towards the orientation shown in FIG. 35.

Figure 36:
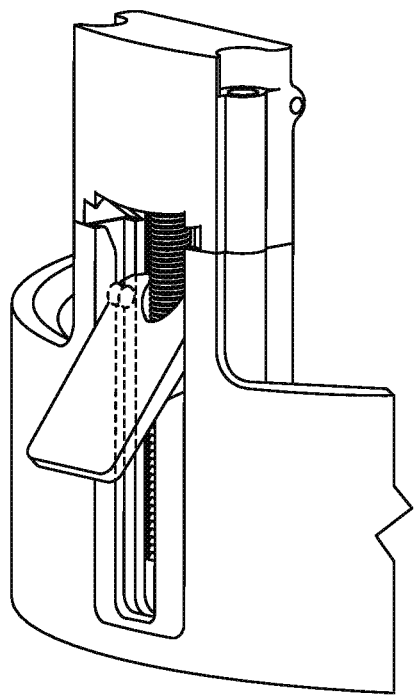
FIG. 36 shows a partial perspective view of a tower assembly formed within a baffle and only partially extending beyond the baffle of the mount assembly, wherein other tower assemblies may be similarly protruding and therefore coupled to each other, according to one embodiment of the invention.

FIG. 36 shows a partial perspective view of a tower assembly formed within a baffle and only partially extending beyond the baffle of the mount assembly, wherein other tower assemblies may be similarly protruding and therefore coupled to each other. The path guide is visible as dashed lines though the dog. In this view it is apparent that the upper portion of the path guide includes space to guide the dog into a first position parallel with the mount, and the lower portion includes space to guide the dog into a second position which is not parallel with the mount.

Figure 37:
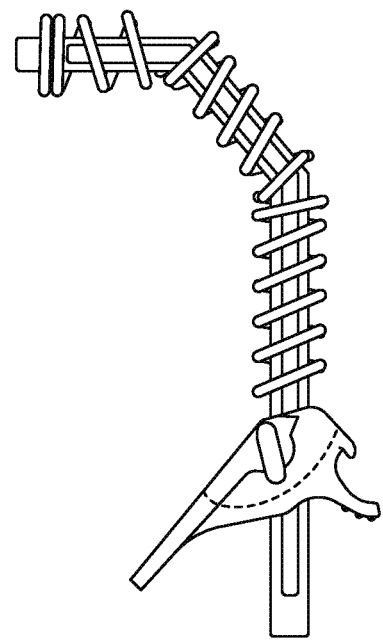
FIG. 37 shows a non-linear path guide with a plurality of bias members in series therealong, according to one embodiment of the invention.

FIG. 37 shows a non-linear path guide with a plurality of bias members in series therealong. There are shown three coil springs, one at each linear portion of the illustrated path guide. The illustrated dog is fully deployed with the finger thereof extending (flipped-out).

Figure 38:
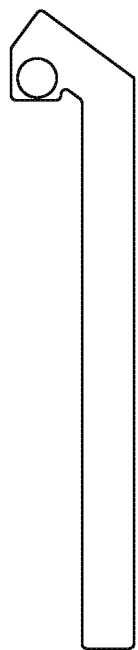
FIGS. 38-40 show non-limiting prophetic embodiments of non-linear path guides, according to one embodiment of the invention.
Figure 39:
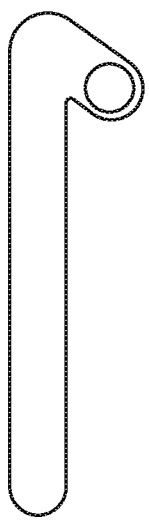
Figure 40:
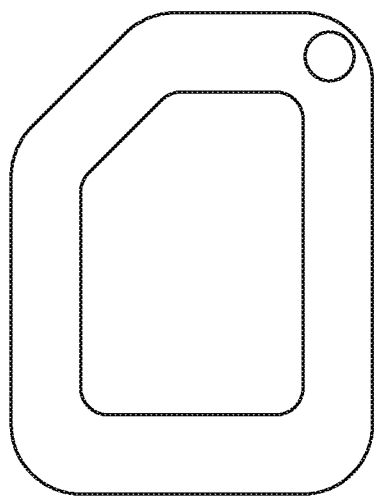

FIGS. 38-40 show non-limiting prophetic embodiments of non-linear path guides. Such guides may be formed by slots through tower bodies. FIGS. 38 and 39 each show path guides having ledges/shelves that may, with other structures, form trigger mechanisms to allow for dogs to spring downward when triggered such that they are pushed/pulled off the shelf (e.g. see FIGS. 41-44). FIG. 40 is a circular path guide that allows for circular travel of a dog instead of a back/forth up/down travel.

FIGS. 41-44 show operation of a button shaft dislodging a dog from a shelf of a non-linear path guide and thereby triggering the dog to flip outward and downward along the path guide. FIGS. 41 and 42 show a single body dog while FIGS. 43 and 44 show a two-piece dog.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims. Further, it is contemplated that an embodiment may be limited to consist of or to consist essentially of one or more of the features, functions, structures, methods described herein.

What is claimed is:

1. A speaker mount, comprising:
   a. a speaker baffle including a flange;
   b. a tower assembly protruding from a backside of the speaker baffle, including:
      i. a dog, including:
      ii. a dog body; and
      iii. a foot extending from the dog body;
   c. a bias member extending lengthwise along the tower assembly and functionally coupled to the dog, thereby biasing the dog towards the speaker baffle;
   d. a path guide extending lengthwise along the tower assembly and functionally coupled to the dog such that the dog travels lengthwise along the tower assembly, wherein the path guide allows the dog to be oriented according to:
      i. a first orientation wherein the foot is pointed directly towards the speaker baffle and is substantially aligned with a lengthwise orientation of the tower assembly such that the foot does not interfere with travel of the speaker mount through an aperture when the dog is in a first position that is spaced away from the speaker baffle; and
      ii. a second orientation wherein the foot is not pointed directly towards the speaker baffle and substantially unaligned with the lengthwise orientation of the tower assembly such that the foot does interfere with travel of the speaker mount through an aperture when the dog is in a second position that is spaced closer to the speaker baffle than the first position, wherein the dog changes from the first position to the second position by operation of the bias member and not by operation of a screw; and
   e. a trigger in functional communication with the dog when the dog is in the first position.

2. The speaker mount of claim 1, further comprising a bias member guide extending lengthwise along the tower assembly that traps the bias member in an orientation lengthwise along the tower assembly.

3. The speaker mount of claim 2, wherein the bias member guide is a pillar about which the bias member is disposed.

4. The speaker mount of claim 1, further comprising an array of teeth facing a backside of the dog body when the dog body is in the second position that mate with a dog tooth of the dog body.

5. The speaker mount of claim 1, further comprising a cap covering a top of the tower assembly, wherein the cap restricts a teeth body from exiting the top of the tower assembly, the teeth body including an array of serrated protrusions.

6. The speaker mount of claim 1, further comprising a tower void in an interior of the tower assembly within which the bias member and a portion of the dog body is disposed.

7. The speaker mount of claim 1, further comprising a path tab extending from the dog body mating with the path guide.

8. The speaker mount of claim 1, wherein the dog body is a spring cup mated with the bias member and the foot is rotatably coupled to the spring cup.

9. The speaker mount of claim 1, wherein the dog a single formed body without articulating members.

10. A mount assembly for mounting an accessory item into a wall body, comprising:
   a. a mount body, including a flange;
   b. a tower assembly protruding from a backside of the mount body, including:
      i. a dog, including:
      ii. a dog body; and
      iii. a foot extending from the dog body;
   c. a bias member functionally coupled to the dog, thereby biasing the dog towards the mount body;
   d. a path guide extending lengthwise along the tower assembly and slidably coupled to the dog such that the dog travels lengthwise along the tower assembly, wherein the path guide allows the dog to be oriented according to:
      i. a first orientation wherein the foot is pointed directly towards the mount body and is substantially aligned with a lengthwise orientation of the tower assembly such that the foot does not interfere with travel of the mount assembly through an aperture when the dog is in a first position that is spaced away from the mount body; and
      ii. a second orientation wherein the foot is not pointed directly towards the mount body and substantially unaligned with the lengthwise orientation of the tower assembly such that the foot does interfere with travel of the mount assembly through an aperture of the wall body when the dog is in a second position that is spaced closer to the mount body than the first position and is also spaced near to the flange, wherein the dog changes from the first position to the second position by operation of the bias member and not by operation of a screw; and
   e. a trigger in functional communication with the dog when the dog is in the first position.

11. The mount assembly of claim 10, further comprising a bias member guide extending lengthwise along the tower assembly that traps the bias member in an orientation lengthwise along the tower assembly.

12. The mount assembly of claim 11, wherein the bias member guide is a pillar about which the bias member is disposed.

13. The mount assembly of claim 12, further comprising a teeth body having array of teeth facing a backside of the dog body when the dog body is in the second position that mate with a dog tooth of the dog body.

14. The mount assembly of claim 13, further comprising a cap covering a top of the tower assembly, wherein the cap restricts the teeth body from exiting the top of the tower assembly.

15. The mount assembly of claim 14, further comprising a tower void in an interior of the tower assembly within which the bias member and a portion of the dog body is disposed.

16. The mount assembly of claim 15, wherein the dog body is a spring cup mated with the bias member and the foot is rotatably coupled to the spring cup.

17. The mount assembly of claim 15, wherein the dog a single formed body without articulating members.

18. The mount assembly of claim 17, further comprising a path tab protruding from the dog body mating with the path guide.

19. The mount assembly of claim 18, wherein the path tab is elongated orthogonal to an axis of protrusion from the dog body and wherein the path guide includes a curved region at a top of the path guide thereof that is sized to force the path tab to rotate when the dog is in the first position.

20. A speaker mount, comprising:
   a. a speaker baffle including a flange;
   b. a tower assembly protruding from a backside of the speaker baffle, including:
      i. a dog, including:
      ii. a dog body; and
      iii. a foot extending from the dog body;
   c. a bias member extending lengthwise along the tower assembly and functionally coupled to the dog, thereby biasing the dog towards the speaker baffle;
   d. a path guide extending lengthwise along the tower assembly and functionally coupled to the dog such that the dog travels lengthwise along the tower assembly, wherein the path guide allows the dog to be oriented according to:
      i. a first orientation wherein the foot is pointed directly towards the speaker baffle and is substantially aligned with a lengthwise orientation of the tower assembly such that the foot does not interfere with travel of the speaker mount through an aperture when the dog is in a first position that is spaced away from the speaker baffle; and
      ii. a second orientation wherein the foot is not pointed directly towards the speaker baffle and substantially unaligned with the lengthwise orientation of the tower assembly such that the foot does interfere with travel of the speaker mount through an aperture when the dog is in a second position that is spaced closer to the speaker baffle than the first position, wherein the dog changes from the first position to the second position by operation of the bias member and not by operation of a screw;
   e. a trigger in functional communication with the dog when the dog is in the first position;
   f. a pillar extending lengthwise along the tower assembly and disposed within the bias member, the pillar trapping the bias member in an orientation lengthwise along the tower assembly;

g. a teeth body having array of teeth facing a backside of the dog body when the dog body is in the second position that mate with a dog tooth of the dog body;

h. a tower void in an interior of the tower assembly within which the bias member and a portion of the dog body is disposed; and i. a path tab extending from the dog body mating with the path guide, wherein the path tab is elongated orthogonal to an axis of protrusion from the dog body and wherein the path guide includes a curved region at a top of the path guide thereof that is sized to force the path tab to rotate when the dog is in the first position.

* * * * *